US005706883A

United States Patent [19]
Ward

[11] Patent Number: 5,706,883
[45] Date of Patent: Jan. 13, 1998

[54] MASS STORAGE AND DISPENSING SYSTEM FOR LIQUIDS SUCH AS CITRUS PRODUCTS

[75] Inventor: Charles R. Ward, LaBelle, Fla.

[73] Assignee: Jack M. Berry, Inc., Alva, Fla.

[21] Appl. No.: 694,879

[22] Filed: Aug. 9, 1996

[51] Int. Cl.⁶ .................................................. F25B 29/00
[52] U.S. Cl. .................... 165/61; 62/59; 62/434; 62/389; 222/146.1
[58] Field of Search .......................... 62/59, 434, 435, 62/54.1, 54.2, 54.3, 389, 390; 165/61, 169, 236; 222/146.1

[56] References Cited

U.S. PATENT DOCUMENTS

| | | | |
|---|---|---|---|
| 1,066,262 | 7/1913 | Dodge | 62/352 |
| 1,882,912 | 10/1932 | Richardson . | |
| 2,087,363 | 7/1937 | Tay . | |
| 2,277,526 | 3/1942 | Mojonnier et al. . | |
| 2,502,589 | 4/1950 | Rabjohn | 165/169 |
| 2,545,371 | 3/1951 | Mojonnier et al. . | |
| 2,629,228 | 2/1953 | Bergmann | 165/169 |
| 2,889,139 | 6/1959 | Hedberg | 165/160 |
| 3,216,215 | 11/1965 | Schuett | 62/435 |
| 3,343,725 | 9/1967 | Cannon | 222/146.1 |
| 4,023,617 | 5/1977 | Carlson et al. . | |
| 4,206,237 | 6/1980 | Sakata et al. . | |
| 4,476,788 | 10/1984 | Loevinger . | |
| 5,000,008 | 3/1991 | Heath . | |
| 5,056,320 | 10/1991 | Winkler | 62/59 |
| 5,399,300 | 3/1995 | Notar | 62/59 |
| 5,577,393 | 11/1996 | Donselmann et al. | 62/390 |

Primary Examiner—William E. Tapolcai
Attorney, Agent, or Firm—Dean W. Russell; Kilpatrick Stockton LLP

[57] ABSTRACT

A system in which mass quantities of liquids may be stored in a substantially frozen state, portions thawed for dispensing, and any undispensed thawed portions rechilled for further storage is disclosed. The system includes a tank with a substantially bell-shaped, or flared, interior, the flaring of the tank surface combining with force of gravity to detach frozen material for dispensing. Separate temperature control sections allow selected areas of the tank to be heated or cooled as necessary, moreover, and distinct reservoirs of heat-transfer liquid (such as glycol) may be used for heating versus cooling the tank.

16 Claims, 6 Drawing Sheets

5,706,883

MASS STORAGE AND DISPENSING SYSTEM FOR LIQUIDS SUCH AS CITRUS PRODUCTS

FIELD OF THE INVENTION

This invention relates to equipment for storing and dispensing substantial masses (quantities) of liquids and more particularly to systems for storing and, as appropriate, indirectly cooling and heating such liquids, which may (but need not) be citrus juices.

BACKGROUND OF THE INVENTION

In an existing system used to store and dispense "not-from-concentrate" citrus juices, juice initially is pumped from a processing facility into holding tanks where it may be tested and, if desired, blended with other juices. If a tanker truck is available to transport the juice from the processing facility to its next destination, the juice may be transferred promptly from the holding tanks to the truck for travel. If, however, a truck is not immediately available, the juice typically is drawn from the holding tanks into fifty-five gallon drums and stored temporarily in freezers.

Once the juice has been frozen in drums, it must thereafter be prepared for transport when a truck becomes available. In such cases the drums are brought through a steam tunnel, which defrosts the juice, and then emptied. The slushy juice is then passed through equipment which mechanically chops the ice crystals formed therein into finer particles so that the juice can be returned to the holding tanks. From the holding tanks, the juice can be pumped into the waiting tanker truck for transport as described in the preceding paragraph.

Although this system is suitable for storing and dispensing masses of liquids, it is, in some respects, both expensive and cumbersome to operate. Purchasing and maintaining thousands of drums require substantial expenditures, and the drums themselves, although reusable, often must be replaced either annually or biannually. Transferring juice from holding tanks to drums and back to holding tanks further complicates the storage process, introducing additional activities into the process that ideally need not occur. Significant energy is expended, moreover, in both defrosting the juice and mechanically chopping its crystals into finer particles.

U.S. Pat. No. 5,000,008 to Heath ("the Heath patent"), incorporated herein in its entirety by this reference, describes another storage system for fruit juices. As disclosed in the Heath patent, the system includes a tank for storing liquid (i.e. juice) on which an ice cap floats. Liquid is pumped from the bottom of the tank through a pipe assembly to the top of the tank, whereupon it "is directed into the upper opening . . . of a substantially vertically oriented communicating tube . . . located within the storage tank." See col. 6, lines 26–29. It then flows through the communicating tube to the bottom of the tank, effectively being recirculated within the tank without contacting the ice cap. According to the Heath patent, the communicating tube thereby provides a vent "functioning as a means of relieving pressure at critical times such as when ice is being formed." See id., lines 39–41.

To thaw the ice cap and empty the tank, the Heath patent discloses raising the temperature of a glycol tracer line forming part of the storage system and using a fan to blow warm air against the sides of the tank. Doing so warms both the liquid circulating through the pipe assembly and the ice cap, purportedly "releasing the attached ice cap . . . from the side walls" of the tank. See col. 7, lines 25–27. Alternatively, "coils which are installed in the side walls" of the tank "are used to supply heat." See id., lines 43–45.

Because primarily directed to avoiding rupture of the storage tank when ice forms in liquids, the Heath patent neither discloses nor contemplates "releasing" the ice cap in other ways. The tank illustrated therein is thus in most respects conventional, having a single wall and formed generally in the shape of a cylinder. The system utilizes an agitator to maintain substantially uniform liquid temperature within the tank, moreover, and employs glycol tracer lines solely to thaw liquid and prevent it from freezing in the pipe assembly. Furthermore, no mechanism for refreezing the liquid after it is thawed is disclosed in the Heath patent, as thawing is described only in conjunction with emptying (the entirety of) the tank.

SUMMARY OF THE INVENTION

The present invention, by contrast, comprises a system in which mass quantities of liquids may be stored in a substantially frozen state, portions thawed for dispensing, and any undispensed thawed portions rechilled for further storage. Including an unconventional tank with a substantially bell-shaped interior, the invention combines the flaring of the tank surface with force of gravity to detach frozen material for dispensing. Separate temperature control sections allow selected areas of the tank to be heated or cooled as necessary, moreover, reducing energy waste that otherwise would occur were such controls not present. In some embodiments distinct reservoirs of glycol (or other heat-transfer material) are used for heating and cooling the tank, and the tank itself may be double-walled.

The invention thus avoids entirely the need for freezing liquid in fifty-five gallon drums when tanker trucks are unavailable to convey it to another destination. Similarly, by maintaining the particular quantity of juice in a single storage tank, the invention omits the steam tunnels and mechanical chopping equipment previously used to warm frozen liquid for removal from the drums. The double walls of the tank additionally insulate the inner shell from the ambient environment, preventing it from interfering with the glycol-based heating and cooling processes.

In one embodiment of the invention, the system includes a holding tank, a liquid chiller, and the substantially bell-shaped storage tank. Juice or similar liquid from the processing facility may, if desired, be routed initially to the holding tank (as in the existing system) for testing and blending with other juices. The so-tested or -mixed juice then travels to the liquid chiller, where it changes into a frozen, slushy state at a temperature of approximately 23°–26° F. An exemplary indirect liquid chiller is the model VS-400 Freezer made by Cherry-Burrell Corporation, in which ammonia circulates within tubing inside the freezer to absorb heat from the juice. The slushy material may then be pumped to the storage tank until ready to be dispensed.

Additionally included in this embodiment are dual glycol reservoirs, a glycol chiller, and a heat exchanger functioning as a glycol heater. Although those skilled in the art will recognize that a single glycol reservoir could be used instead, in many circumstances greater heat-transfer efficiency may be achieved by not having both to heat and to cool the same volume of glycol. Thus, at least this one embodiment of the invention contemplates employing the dual reservoirs, one connected to a chiller and the other to a heating mechanism. After heating or cooling, as the situation warrants, the glycol too may be pumped to the storage tank.

Unlike the juice, however, which resides within the inner shell of the storage tank, any glycol pumped to the tank is normally confined between the inner and outer shells. As a consequence, no heating or cooling liquid is intended ever to contact the juice itself. Food-grade glycol nonetheless is a suitable choice for such liquid because not deemed harmful to humans should it inadvertently contact the juice and ultimately be consumed.

To assist the dispensing process, at least the inner shell of the storage tank may be flared from top to bottom. As noted earlier, configuring the shell in this manner facilitates detaching frozen material from the sides of its interior. When the shell is heated and juice is dispensed from the bottom of the tank, frozen juice above the bottom begins to melt and slide under force of gravity along the surface of the shell. Because that surface continually flares, however, the melting juice will at some point fall from the wall surface rather than remaining adhered to it.

Embodiments of the present invention use baffles to achieve separate temperature control of various sections of the inner shell. Angle irons (or similar material) welded or otherwise attached to the outer surface of the inner shell channel the glycol flowing thereagainst and isolate sections of the shell from other sections. In one embodiment, for example, the inner shell is divided into sections approximately three feet high. If the volume of juice within the inner shell does not extend more than three feet above the bottom, glycol need only be supplied to the lowermost three foot section of the tank. Alternatively or additionally, the area between the inner and outer shells may be divided radially.

Finally, the invention also encompasses use of multiple storage tanks of the type described above in a single facility. Such a tank "farm" may be necessary when volumes of liquid substantially greater than the volume of a single tank have been processed for storage. To the extent the multiple tanks are present in the same general location, the building or other structure within which they are housed may be divided into sections and separately cooled.

It is thus an object of the present invention to provide a system for storing quantities of liquids in a substantially frozen state.

It is also an object of the present invention to provide a system for storing liquids that avoids use of multiple drums, steam tunnels, and mechanical chopping and agitating equipment.

It is another object of the present invention to provide a system for storing liquids in which a tank (or shell of a tank) has a flared interior surface to facilitate detaching frozen liquid from the surface.

It is a further object of the present invention to provide a system for storing liquids in which separate temperature control sections allow selected areas of the tank to be heated or cooled as appropriate.

It is yet another object of the present invention to provide a system for storing liquids in which distinct reservoirs of heat-transfer liquid are used for heating and cooling the tank.

It is additionally an object of the present invention to provide a system for storing liquids employing a double-walled tank, with the heat-transfer liquid confined to the space between the outer surface of the inner shell and the inner surface of the outer shell.

Other objects, features, and advantages of the present invention will become apparent with reference to the remainder of the text and the drawings of this application.

DETAILED DESCRIPTION

Figure 1:
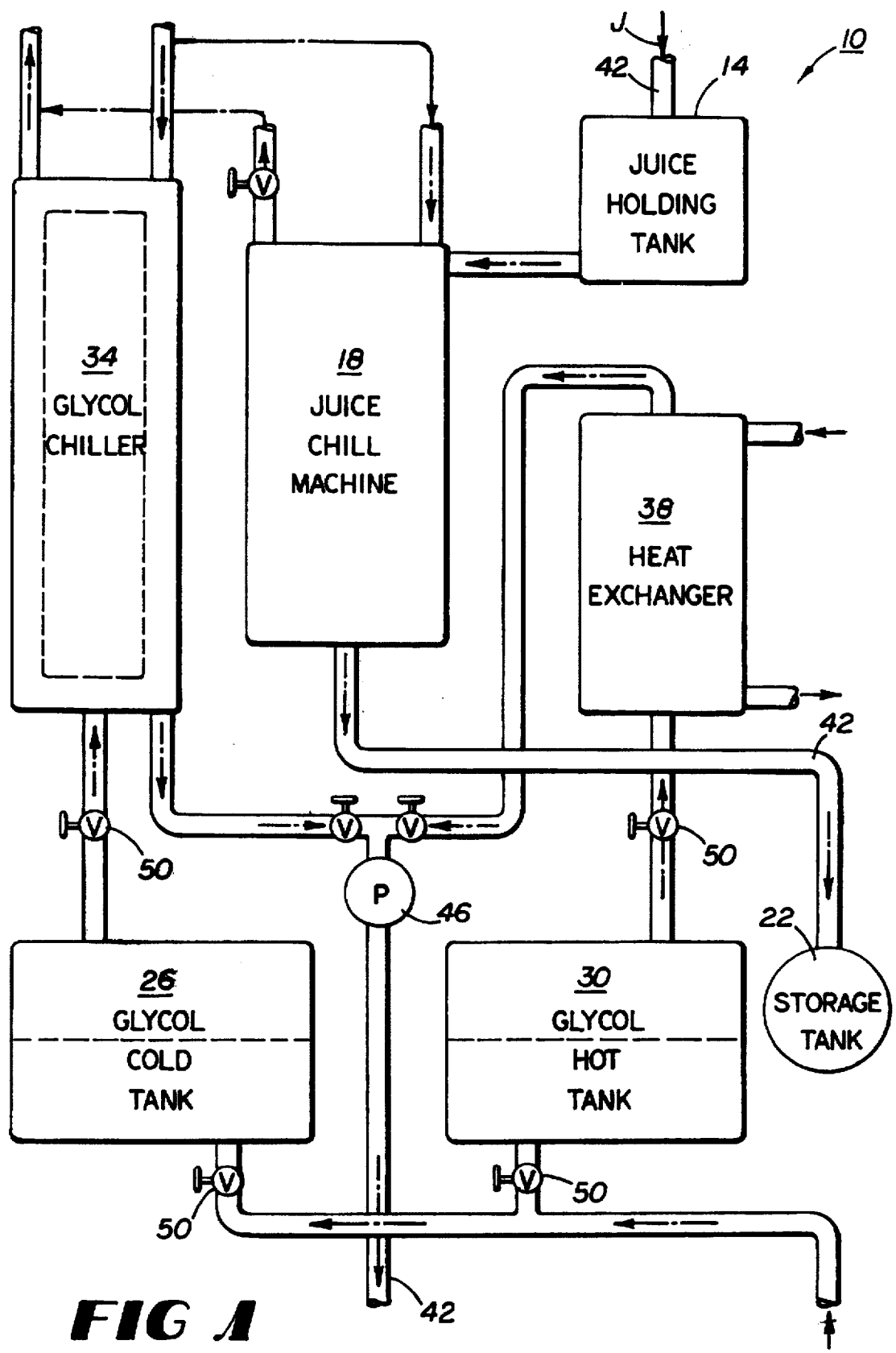
FIG. 1 is a schematic diagram of an embodiment of the system of the present invention.
Figure 2:
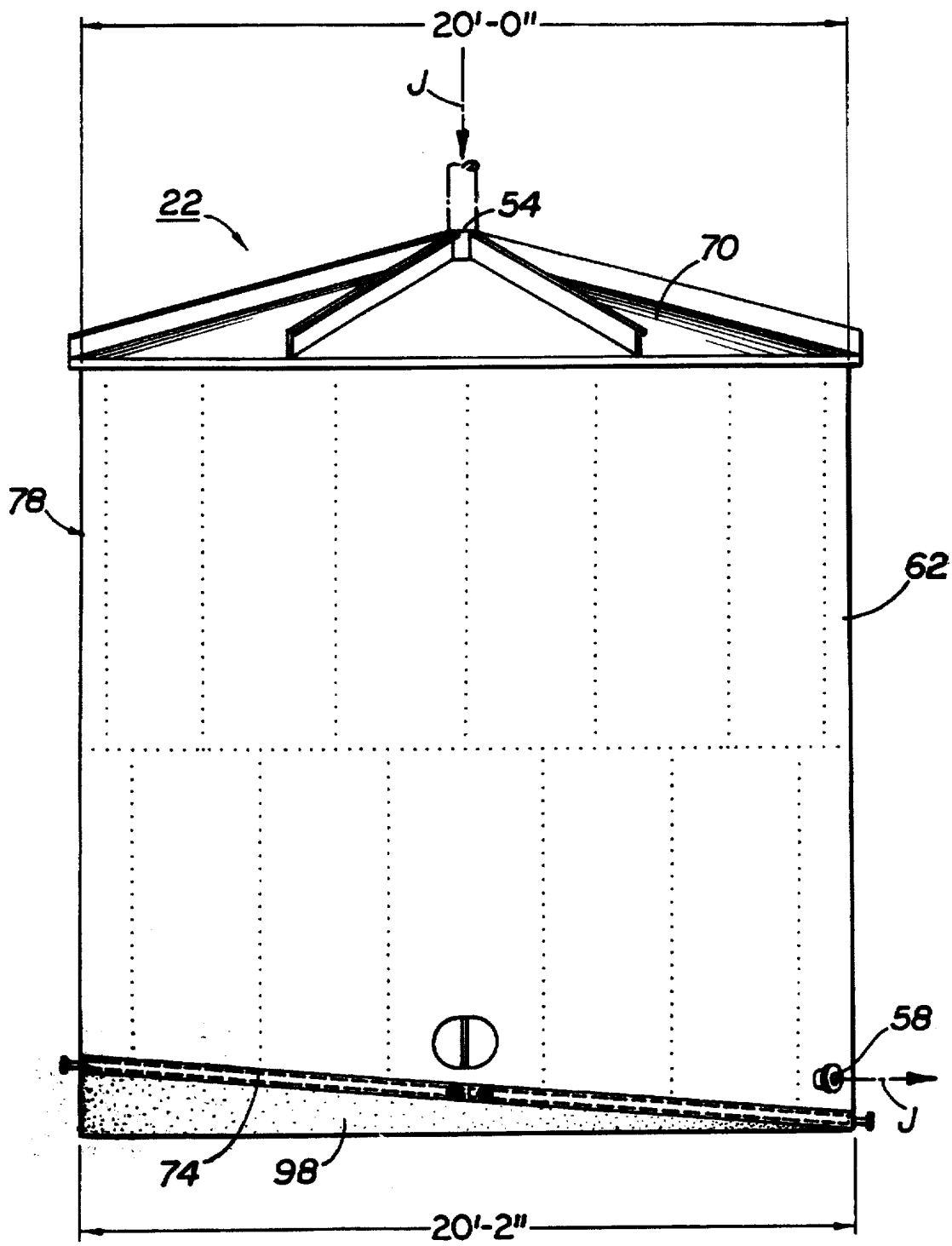
FIG. 2 is an elevational view of a tank useful as part of the system of FIG. 1.

FIG. 1 schematically illustrates system 10 of the present invention. As shown in the embodiment of FIG. 1, system 10 includes holding tank 14, liquid chiller 18, and storage tank 22. Also comprising system 10 of this embodiment are dual (glycol) reservoirs 26 and 30, (glycol) chiller 34, and heat exchanger 38. Juice (or other liquid) J exiting a processing facility enters piping 42 for transport to holding tank 14, where it may be mixed or blended with other juices or liquids if necessary or desired. In one embodiment of the invention, holding tank 14 is a three hundred fifty gallon structure of stainless steel. While in holding tank 14, characteristics (e.g. composition, quality) of juice J may also be tested if appropriate to do so.

Although juice J from holding tank 14 may be transferred directly to a tanker truck or other object in some circumstances, FIG. 1 illustrates such juice J exiting to liquid chiller 18 via piping 42. As noted above, liquid chiller 18 may be a model VS-400 Freezer made by Cherry-Burrell Corporation, in which liquid ammonia A circulates within tubing inside the liquid chiller 18 to absorb heat from juice J. Those skilled in the art will recognize that the model VS-400 Freezer exemplifies the equipment suitable for absorbing heat from juice J and that other mechanisms for so absorbing heat may be used instead.

Juice J, by then comprising a slushy material at a temperature of approximately 23°–26° F., is conveyed through piping 42 to storage tank 22. Unlike some existing systems, embodiments of system 10 consistent with FIG. 1 contemplate retaining juice J in storage tank 22 until dispensed to a tanker truck. Thus, storage tank 22 obviates the need for the fifty-five gallon drums, steam tunnels, and mechanical chopping equipment previously employed. For improved performance of system 10, the air surrounding storage tank 22 preferably should be maintained at a temperature between 18°–20° F.

Once resident in storage tank 22, juice J must be thawed for dispensing. Accordingly, system 10 contemplates pumping glycol from reservoir 30 to heat exchanger 38 to warm it to a temperature of approximately 175°–200° F. Heat exchanger 38 may be a conventional device that uses steam (or any other suitable medium) for heating. After exiting heat exchanger 38, the glycol or other heat-transfer fluid is transferred, again via piping 42, to storage tank 22 to warm juice J indirectly.

Following dispensing of juice J, any remaining juice within storage tank 22 may be rechilled for further storage. Such rechilling is accomplished by passing glycol from reservoir 26 through chiller 34 to cool it to a temperature of approximately zero to –5° F. and then pumping the cooled glycol to storage tank 22. The glycol indirectly absorbs heat from the remaining juice, typically returning the temperature of the juice to between 23°–26° F. Nitrogen may also be injected into or otherwise supplied to storage tank 22 to inhibit formation of bacteria therein.

Glycol chiller 34 is shown in FIG. 1 as being separate from liquid chiller 18. Dividing the cooling functions in this manner obviously decreases the possibility of any glycol mixing with juice J in system 10. Chillers 34 and 18 need not be separate devices, however, and instead may be parts of the same equipment, particularly if the identical cooling mechanism (e.g. ammonia A) is employed. FIG. 1 additionally illustrates various of the many pumps 46 and valves 50 that those skilled in the art will recognize may be used in connection with system 10 to transfer materials to desired locations.

Storage tank 22 (FIGS. 2–8) includes inlet 54, outlet 58, and walls 62 and 66. Together with top 70 and bottom 74 of storage tank 22, wall 62 forms inner shell 78. When pumped to storage tank 22, juice J enters inlet 54 at the top 70 of the tank 22 and is distributed, under force of gravity, to the bottom 74 of inner shell 78. Additional quantities of juice J entering tank 22 likewise fall toward bottom 74, increasingly filling tank 22 until a selected mass of the juice J is stored.

In at least one embodiment of tank 22, wall 66 and top 70 are formed of ten gauge stainless steel, with wall 66 being approximately twenty feet (20 ft.) high. Walls 62 and 66 consistent with the present invention additionally may be generally cylindrical in shape. At least wall 62, however, flares between top 70 and bottom 74, thus having a greater diameter adjacent bottom 74 than near top 70. Such flaring need not be extensive: certain embodiments of tank 22, for example, include a wall 62 whose diameter adjacent top 70 is twenty feet (20 ft.) and whose diameter adjacent bottom 74 is twenty feet, two inches (20 ft., 2 in.). Greater or lesser flaring of wall 62 may, of course, be useful in different circumstances. Wall 66 similarly may be flared if desired, although doing so is not necessary in the context of the present invention.

Flaring wall 62 results in a configuration of inner shell 78 that facilitates detaching frozen juice J from the wall 62. In general, substantially frozen liquid tends to adhere to the side walls of cylindrical and other storage tanks, making detachment of the liquid for dispensing difficult. The Heath patent appears to recognize this problem, describing use of various heating mechanisms to "release" an attached "ice cap." In my experience merely heating a tank is often inadequate to detach substantially all of the liquid from the side walls, however, and thus additional means—such as flaring wall 62—are required. Hence, when inner shell 78 is heated and juice J is dispensed from outlet 58, frozen juice J above bottom 74 begins to melt and slides under force of gravity along the surface of continually-flaring wall 62, at some point falling from wall 62 rather than remaining adhered to it.

Between walls 62 and 66 are baffles 82. Angle irons or similar objects may be used as baffles 82, operating to channel flow of liquid glycol or other thermal transfer material to wall 62. Baffles 82, if metal, may be welded to the exterior of wall 62, although those skilled in the art will recognize that other means of attaching baffles 82 to either or both of walls 62 and 66 may be employed.

Figure 3:
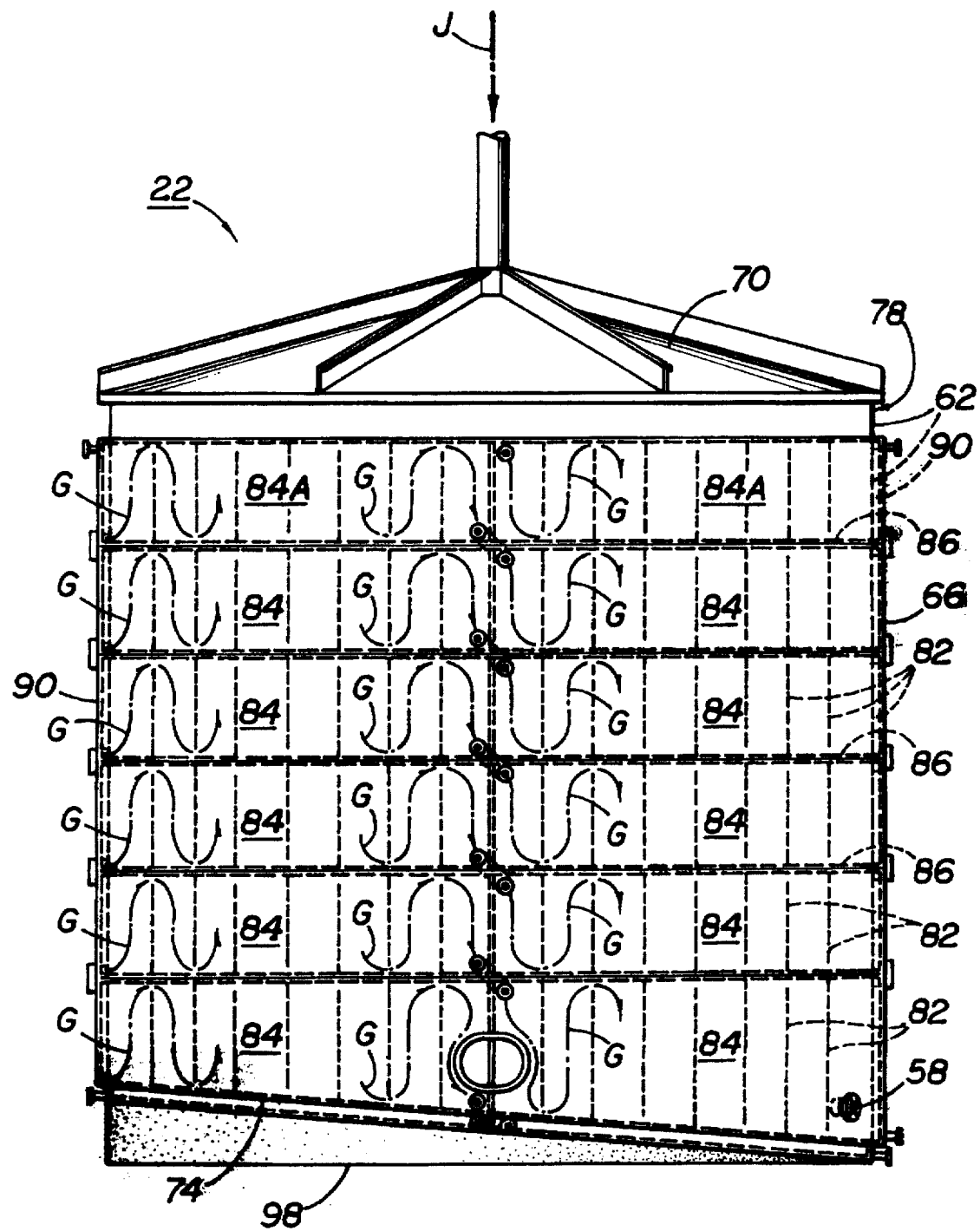
FIG. 3 is an elevational, partially cut-away view of the tank of FIG. 2.
Figure 4:
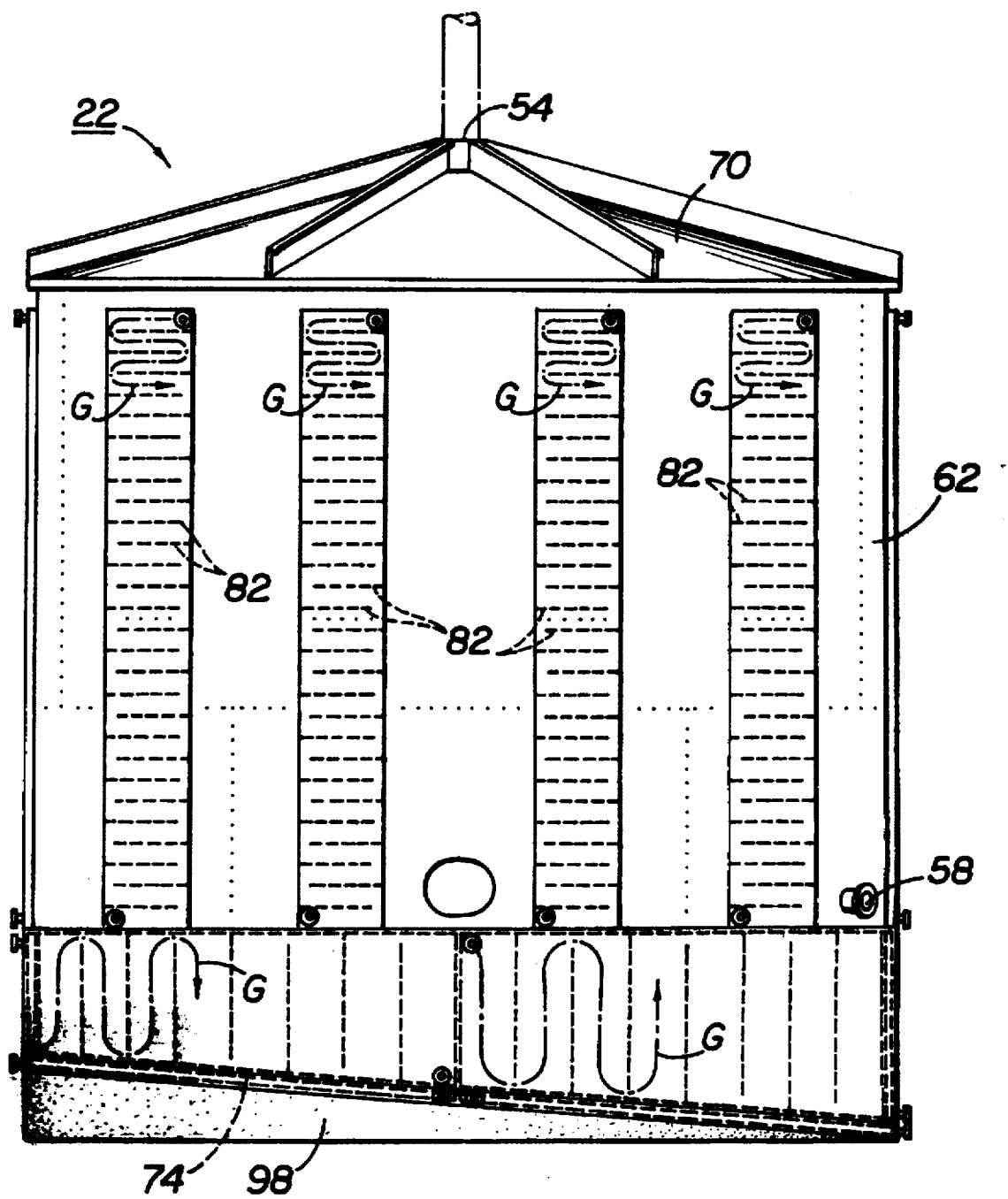
FIG. 4 is an elevational, partially cut-away view of an alternate embodiment of the tank of FIG. 2.
Figure 5:
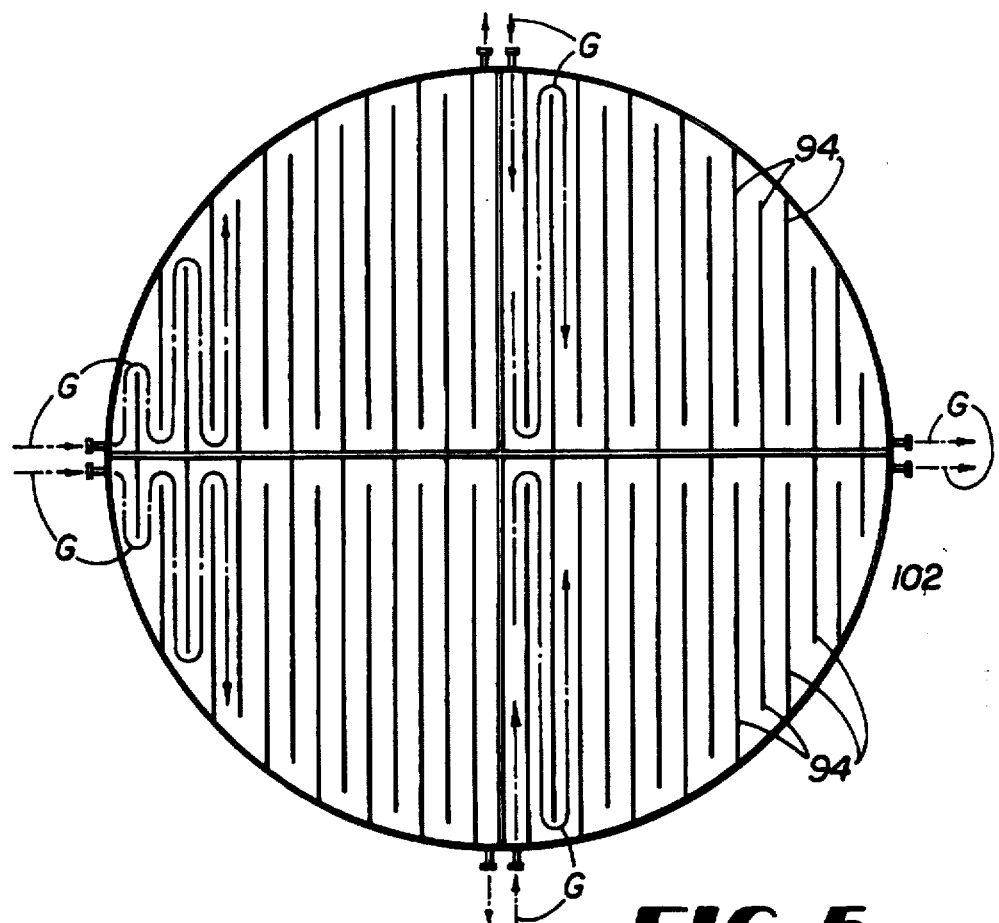
FIG. 5 is a top plan view of the bottom of the tank of FIG. 2.

FIGS. 3–4 illustrate alternate methods of employing baffles 82. In FIG. 3, for example, baffles 82 channel glycol G in paths (shown by arrows) through relatively small vertical sections 84 of storage tank 22. Horizontal plates 86 divide the area between walls 62 and 66 into these sections 84, which in certain embodiments consistent with FIG. 3 are approximately three feet high. Because each section 84 may be valved independently of other sections 84, glycol G may be permitted to pass through some sections 84 while not through others at any particular time.

Independent temperature control of each such section 84 may thus be obtained simply by appropriately setting the valve (or other mechanism) that allows flow of glycol G into the section 84 of interest. This independence is especially useful when juice J does not fill tank 22. For example, if juice J is not present in the uppermost portion of tank 22, glycol G need not be circulated through sections 84A of FIG. 3 to cool or heat the juice J. Vertically-oriented plates 90 may be used if desired to subdivide further the area between walls 62 and 66 for even greater temperature control of juice J. In the alternate paths of FIG. 4, baffles 82 channel glycol G essentially vertically through the area of tank 22 between walls 62 and 66 to achieve this purpose.

Figure 6:
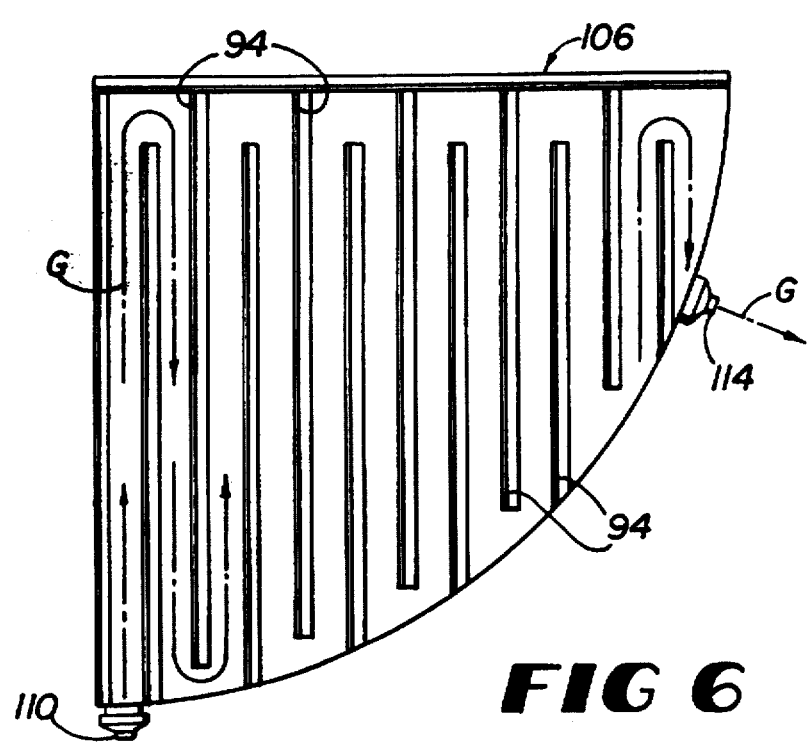
FIG. 6 is an enlarged top plan view of a portion of the bottom of FIG. 5.
Figure 7:
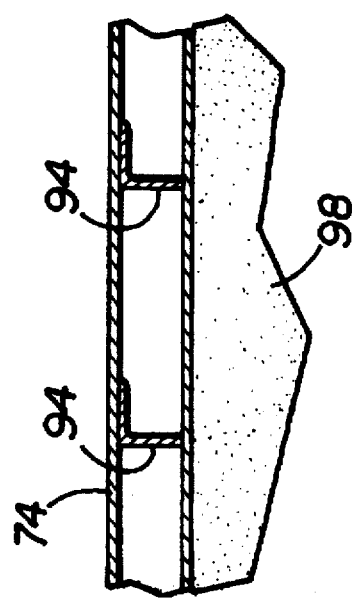
FIG. 7 is an elevational view of a baffle in the bottom of FIG. 5.
Figure 8:
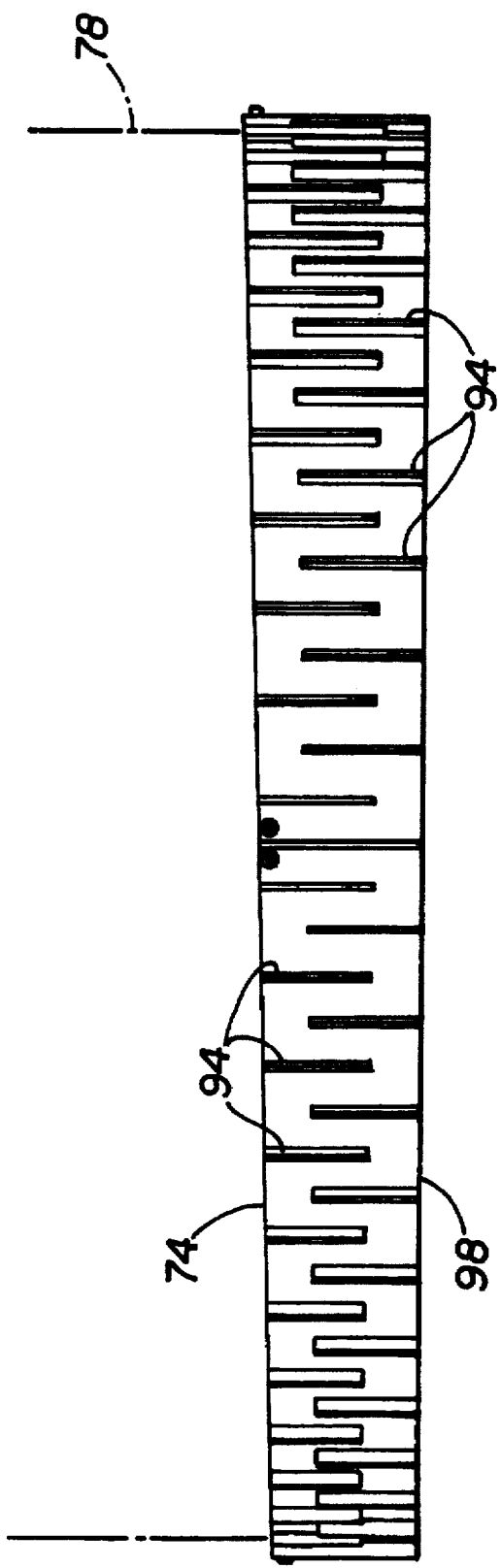
FIG. 8 is an elevational view of a series of baffles in the bottom of FIG. 5.

FIGS. 5–8 detail baffles 94 present between bottom 74 and base 98 of tank 22. Together with plates 102, baffles 94 channel glycol G as shown in the paths printed in FIGS. 5–6, with plates 102 dividing the area between bottom 74 and base 98 into quadrants to enhance temperature control of juice J. FIG. 6 illustrates one such quadrant, or zone 106, in which glycol G enters through inlet 110, circulates through the zone 106, and exits via outlet 114 to piping 42. Providing such zoned temperature control is useful both in dispensing and storing juice J, and it eliminates the need for an agitator such as that included in the system of the Heath patent. FIG. 8 additionally illustrates the sloping nature of bottom 74 facilitating flow of juice J to outlet 58.

The foregoing is provided for purposes of illustrating, explaining, and describing embodiments of the present invention. Modifications and adaptations to these embodiments will be apparent to those of skill in the art and may be made without departing from the scope or spirit of the invention. For example, although various dimensions, shapes, and other characteristics of tank 22 and its components have been illustrated or described, the invention is, of course, not necessarily limited to tanks having identical characteristics, but may include other tanks or analogous equipment designed to accomplish results similar to those of the present invention.

What is claimed is:

1. A system for storing a material in a substantially frozen state and for thereafter dispensing the material, comprising:
   a. means for storing the material, such means comprising a storage tank having:
      i. an inlet for receiving the material;
      ii. an outlet for dispensing the material;
      iii. a top;
      iv. a bottom; and
      v. a side connecting the top and bottom, the side of the tank flaring from the top to the bottom;
   b. means for indirectly heating the material for dispensing through the outlet; and
   c. means for indirectly cooling any undispensed material to return it to its substantially frozen state.

2. A system according to claim 1 further comprising means, connected to the storage tank, for causing the material to assume the substantially frozen state.

3. A system according to claim 2 in which the substantially frozen state-causing means comprises chilling equipment in which liquid ammonia circulates through at least one pipe, the pipe preventing direct contact between the ammonia and the material.

4. A system according to claim 3 further comprising a plurality of pipes for connecting the chilling equipment to the storage tank.

5. A system according to claim 4 further comprising a holding tank connected to the chilling equipment.

6. A system according to claim 5 in which (1) the means for indirectly heating the material comprises a first reservoir for containing a first substance and a heat exchanger connected to the first reservoir and (2) the means for indirectly cooling the material comprises a second reservoir for containing a second substance.

7. A system according to claim 6 further comprising means for connecting each of the first and second reservoirs to the storage tank so that the first and second substances can circulate between them.

8. A system according to claim 7 in which the first and second substances comprise glycol.

9. A system according to claim 1 in which (1) the means for indirectly heating the material comprises a first reservoir for containing a first substance and (2) the means for indirectly cooling the material comprises a second reservoir for containing a second substance.

10. A system according to claim 9 further comprising means for connecting each of the first and second reservoirs to the storage tank so that the first and second substances can circulate between them.

11. A system according to claim 10 in which the first and second substances comprise glycol.

12. A system according to claim 1 in which the storage tank further has baffles adjacent at least its bottom.

13. A system according to claim 12 in which (1) the means for indirectly cooling the material comprises a reservoir for containing a substance and (2) the baffles define a channel for the substance to circulate within at least a portion of the storage tank.

14. A system according to claim 13 in which the storage tank additionally has baffles adjacent at least a portion of its side.

15. A system for storing a mass quantity of a material in a substantially frozen state, the material having exited a processing facility in a substantially liquid state, and for thereafter dispensing the material, the system comprising:

a. a holding tank for receiving the material in substantially liquid state;

b. chilling equipment for substantially freezing the material previously received by the holding tank;

c. a storage tank having:
     i. an inlet for receiving the material exiting the chilling equipment;
     ii. an outlet for dispensing the material;
     iii. a top;
     iv. a bottom;
     v. a side connecting the top and bottom to form an inner shell, the side of the tank flaring from the top to the bottom; and
     vi. an outer shell surrounding the inner shell;

d. first and second reservoirs, each containing glycol;

e. means for cooling glycol received from the first reservoir and circulating the cooled glycol through the tank between the inner and outer shells;

f. means for heating glycol received from the second reservoir and circulating the heated glycol through the tank between the inner and outer shells; and g. means, comprising pipes, for connecting (1) the processing facility to the holding tank, (2) the holding tank to the chilling equipment, (3) the chilling equipment to the inlet of the storage tank, (4) the first reservoir and the glycol-cooling means, and (5) the second reservoir and the glycol-heating means.

16. A method of storing a material in a substantially frozen state and thereafter dispensing the material, comprising:

a. storing the substantially-frozen material in a tank having:
     i. an inlet for receiving the material;
     ii. an outlet for dispensing the material;
     iii. a top;
     iv. a bottom; and
     v. a side connecting the top and bottom, the side of the tank flaring from the top to the bottom;

b. causing at least some of the substantially-frozen material to detach from the flared side of the tank as it travels toward the bottom of the tank under force of gravity, such detachment occurring as the substantially-frozen material is heated and a portion of the material is dispensed through the outlet; and c. cooling any undispensed material to return it to its substantially frozen state.

\* \* \* \* \*